United States Patent
Sun et al.

(10) Patent No.: US 7,116,513 B1
(45) Date of Patent: Oct. 3, 2006

(54) POSITIONING TRANSDUCERS BASED ON A COMPENSATION SCHEME THAT VARIES BASED ON TRANSDUCER VIBRATIONAL STATE

(75) Inventors: Yu Sun, Fremont, CA (US); Lin Guo, Saratoga, CA (US); Xiaoping Hu, Milpitas, CA (US)

(73) Assignee: Maxtor Corporation, Longmont, CO (US)

(*) Notice: Subject to any disclaimer, the term of this patent is extended or adjusted under 35 U.S.C. 154(b) by 9 days.

(21) Appl. No.: 10/999,552

(22) Filed: Nov. 30, 2004

Related U.S. Application Data (60) Provisional application No. 60/578,463, filed on Jun. 9, 2004.

(51) Int. Cl.
*G11B 5/596* (2006.01)
(52) U.S. Cl. .................................. 360/77.02
(58) Field of Classification Search ............... None
See application file for complete search history.

(56) References Cited

U.S. PATENT DOCUMENTS

| | | | |
|---|---|---|---|
| 6,256,160 B1 | 7/2001 | Liikanen et al. | 360/48 |
| 6,493,176 B1 | 12/2002 | Deng et al. | 360/78.05 |
| 6,710,966 B1 * | 3/2004 | Codilian et al. | 360/77.08 |
| 2003/0011914 A1 * | 1/2003 | Angelo et al. | 360/25 |

\* cited by examiner

*Primary Examiner*—Hoa T. Nguyen
*Assistant Examiner*—Mitchell Slavitt
(74) *Attorney, Agent, or Firm*—Myers Bigel Sibley & Sajovec, P.A.

(57) ABSTRACT

A disk drive includes a transducer and a rotatable disk, which includes a plurality of tracks. A vibration state of the transducer relative to the disk is determined. The transducer is positioned relative one of the tracks based on a compensation scheme that varies based on the determination of the vibration state. The compensation scheme may be varied by selecting among output of two or more compensators, based on the determined of the vibration state of the transducer, to control positioning of the transducer. The compensation scheme may alternatively, or additionally, be varied by varying a contribution from a vibration state actuator compensator to the control of positioning of the transducer. The vibration state actuator compensator is configured to improve transducer track following while the transducer is subjected to vibration.

22 Claims, 6 Drawing Sheets

POSITIONING TRANSDUCERS BASED ON A COMPENSATION SCHEME THAT VARIES BASED ON TRANSDUCER VIBRATIONAL STATE

RELATED APPLICATION

This application claims the benefit of and priority to U.S. Provisional Patent Application No. 60/578,463, filed Jun. 9, 2004, the disclosure of which is hereby incorporated herein by reference as if set forth in its entirety.

FIELD OF THE INVENTION

The present invention relates to disk based storage devices and, more particularly, to positioning transducers relative to tracks on a data storage disk.

BACKGROUND OF THE INVENTION

Figure 1:
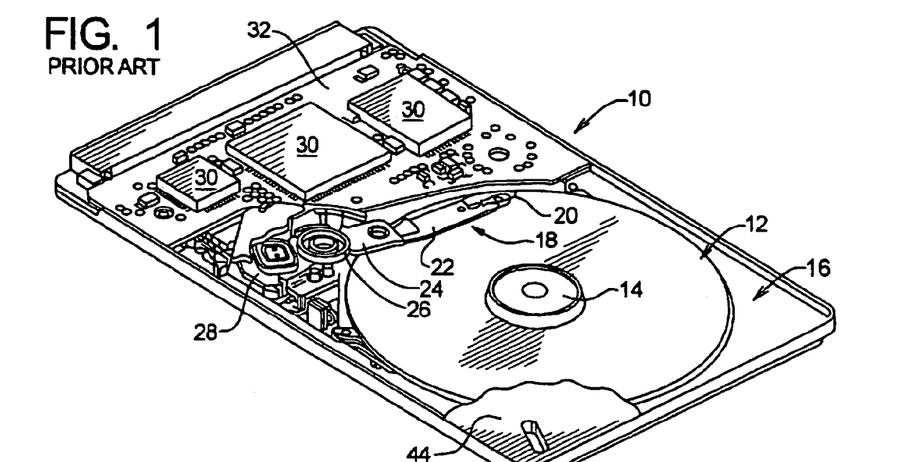
FIG. 1 is a perspective view of a conventional disk drive.

A simplified diagrammatic representation of a disk drive, generally designated as 10, is illustrated in FIG. 1. The disk drive 10 comprises a disk stack 12 (illustrated as a single disk in FIG. 1) that is rotated by a spindle motor 14. The spindle motor 14 is mounted to a base plate 16. An actuator arm assembly 18 is also mounted to the base plate 16.

The actuator arm assembly 18 includes a transducer 20 (or head) mounted to a flexure arm 22 which is attached to an actuator arm 24 that can rotate about a pivot bearing assembly 26. The actuator arm assembly 18 also includes a voice coil motor 28 which moves the transducer 20 relative to the disk 12. The spin motor 14, and actuator arm assembly 18 are coupled to a number of electronic circuits 30 mounted to a printed circuit board 32. The electronic circuits 30 typically include a digital signal processor (DSP), a microprocessor-based controller and a random access memory (RAM) device.

Figure 2:
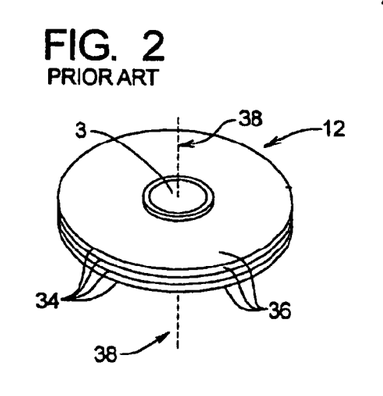
FIG. 2 is a perspective view of a conventional disk stack having a plurality of hard disks.

Referring now to the illustration of FIG. 2, the disk stack 12 typically includes a plurality of disks 34, each of which may have a pair of disk surfaces 36. The disks 34 are mounted on a cylindrical shaft and are designed to rotate about axis 38. The spindle motor 14 as mentioned above, rotates the disk stack 12.

Figure 3:
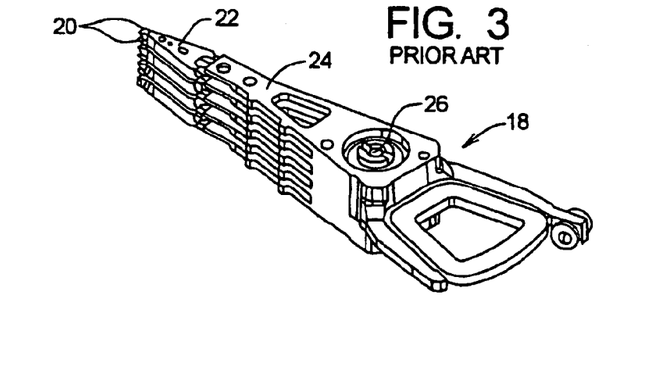
FIG. 3 is a perspective view of a portion of an actuator arm assembly having a plurality of actuator arms.

Referring now to the illustration of FIGS. 1 and 3, the actuator arm assembly 18 includes a plurality of the transducers 20, each of which correspond to one of the disk surfaces 36. Each transducer 20 is mounted to a corresponding flexure arm 22 which is attached to a corresponding portion of the actuator arm 24 that can rotate about the pivot bearing assembly 26. The VCM 28 operates to move the actuator arm 24, and thus moves the transducers 20 relative to their respective disk surfaces 36.

Although the disk stack 12 is illustrated having a plurality of disks 34, it may instead contain a single disk 34, with the actuator arm assembly 18 having a corresponding single actuator arm 24.

Figure 4:
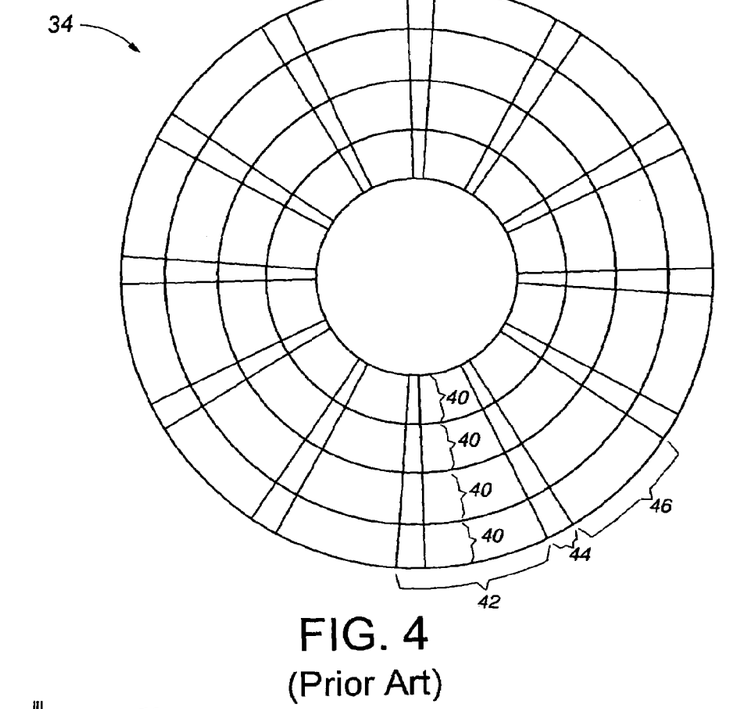
FIG. 4 is a top view a conventional disk and illustrates tracks and sectors, with each of the sectors being divided into a servo region and a data region.

FIG. 4 further illustrates one of the disks 34. Data is stored on the disk 34 within a number of concentric radial tracks 40 (or cylinders). Each track is divided into a plurality of sectors 42. Each sector 42 is further divided into a servo region 44 and a data region 46. The servo regions 44 of the disk 34 are used to, among other things, accurately position the transducer 20 so that data can be properly written onto and read from the disk 34. The data regions 46 are where non-servo related data (i.e., user data) is stored and retrieved. Such data, upon proper conditions, may be overwritten.

Figure 5:
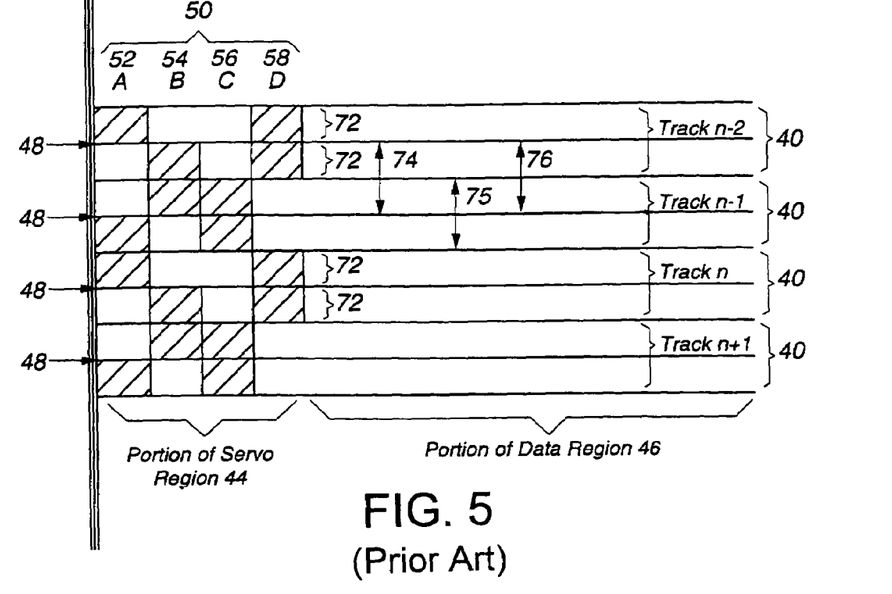
FIG. 5 is a top view of a disk, and illustrates portions of conventional tracks, and a relationship between servo track pitch and data track pitch.

FIG. 5 shows portions of tracks 40 for the disk 34 of FIG. 4 drawn in a straight, rather than arcuate, fashion for ease of depiction. To accurately write data to and read data from the data region 46 of the disk 34, it is desirable to maintain the transducer 20 in a relatively fixed position with respect to a given track's centerline 48 during each of the writing and reading procedures (called a track following operation). Tracks n−2 through n+1, including their corresponding centerlines 48, are shown in FIG. 5.

To assist in controlling the position of the transducer 20 relative to the track centerline 48, the servo region 44 contains, among other things, servo information in the form of servo patterns 50 comprised of one or more groups of servo bursts, as is well-known in the art. First, second, third and fourth servo bursts 52, 54, 56, 58 (commonly referred to as A, B, C and D servo bursts, respectively) are shown in FIG. 3. The servo bursts 52, 54, 56, 58 are accurately positioned relative to the centerline 48 of each track 40. Unlike information in the data region 46, servo bursts 52, 54, 56, 58 may not be overwritten or erased during normal operation of the disk drive 10.

As the transducer 20 is positioned over a track 40 (i.e., during a track following operation), it reads the servo information contained in the servo regions 44 of the track 40, one servo region 44 at a time. The servo information is used to, among other things, generate a position error signal (PES) as a function of the misalignment between the transducer 20 and a desired position relative to the track centerline 48. As is well-known in the art, the PES signals are input to a servo control loop (within the electronic circuits 30) which performs calculations and outputs a servo compensation signal which controls the VCM 28 to, ideally, place the transducer 20 at the desired position relative to the track centerline 48.

Vibration of the disk drive can cause the transducer 20 to have an across track vibration, which can effect that ability of the servo control loop to maintain the transducer 20 on a track during a track following operation. The servo control loop can be configured to compensate for a worst-case amount of vibration, within design constraints, that the transducer 20 may experience while in a track following operation on various tracks across the disk 34. However, optimizing the servo control loop for worst-case vibration conditions may provide less optimal performance (e.g., less data throughput than otherwise possible) in non-vibration conditions.

A servo track writer (STW) is used to write servo regions 44, including their corresponding fields, onto the surface(s) of the disks 34 during the manufacturing process. The STW controls the transducers 20 corresponding to each disk surface 36 of the disks 34 to write the servo regions 44. In order to precisely write the servo regions 44 at desired locations on the disks 34, the STW directs each transducer 20 to write in small steps, with each step having a width (i.e., STW step width 72 as shown in FIG. 5). FIG. 5 illustrates the relationship between the STW step width 72 and the pitch 74 of the servo region 44 for a conventional disk drive system.

As used herein, the term "pitch" is the radial distance between centers of adjacent regions on the surfaces 36 of the disks 34. For example, a servo track pitch 74 (shown in the data region 46 of FIG. 5) is the distance between the centers of radially adjacent servo regions 44. In contrast, the term "width" is defined as the radial distance from one end to the other end of a single region. For example, a servo track width 75 (shown in the data region 46 of FIG. 5) is the width from one end to another of a single servo region 44.

For each servo region 44, the servo track pitch 74 is generally equivalent to the servo track width 75. However, for data regions 46, the data track pitch 76 is generally different from the actual data track width (not shown) due to, for example, the presence of erase bands which are typically found on both sides of each data region 46. For simplicity, the effects that reduce the data track width are not shown in the figures. Instead, the data track width is shown to be the same as the data track pitch. Although the data track pitch 76 is illustrated as a constant amount across the tracks 40, it is known to vary the data track pitch, and thereby the data tracks per inch (TPI), across a disk surface.

SUMMARY OF THE INVENTION

Some embodiments of the present invention provide methods of controlling positioning of a transducer that is adjacent to a rotatable disk in a disk drive. A vibration state of the transducer relative to the disk is determined. Positioning of the transducer is controlled to maintain the transducer on a track on the disk based on a compensation scheme that varies based on the determination of the vibration state.

In some further embodiments of the present invention, the vibration state of the transducer relative to the disk may be determined based on whether the transducer is subjected to at least a threshold amount of vibration. The vibration state of the transducer may be determined by monitoring a position error signal that is based on the transducer reading servo information on the disk. Monitoring of the position error signal can include determining whether the position error signal repetitively exceeds a threshold value a threshold number of times within a number of sectors and/or an elapsed time. Monitoring can alternatively, or additionally, include monitoring power spectrum of the position error signal. The vibration state of the transducer may be determined by monitoring throughput of data read from and/or written to the disk.

In some further embodiments of the present invention, positioning of the transducer may be controlled based on a selection among the output of two or more compensators. The selection is based on the determined vibration state of the transducer. At least two of the compensators have different disturbance transfer functions. One of the compensators may be configured to improve transducer track following while the transducer is subjected to vibration, and another one of the compensators may be configured to improve throughput of data read from and/or written to the disk.

In some further embodiments of the present invention, positioning of the transducer may be controlled based on a varying contribution from a vibration state actuator compensator. The amount of contribution from the vibration state actuator compensator is varied based on the determined vibration state of the transducer. The vibration state actuator compensator is configured to improve transducer track following while the transducer is subjected to vibration. The output of the vibration state actuator compensator may be filtered a variable amount based on the determined vibration state of the transducer. The filtered output of the vibration state actuator compensator may then be combined with an output of a non-vibration state actuator compensator to control the positioning of the transducer. The non-vibration state actuator compensator can be configured to improve throughput of data read from and/or written to the disk while the transducer is not subjected to vibration (e.g., less than a threshold amount of vibration).

In some other embodiments of the present invention, a disk drive includes a rotatable disk, a transducer, an actuator, and a controller. The transducer is configured to read data from the disk. The actuator is configured to position the transducer relative to the disk. The controller is configured to determine a vibration state of the transducer relative to the disk, and to control positioning of the transducer to maintain the transducer on a track on the disk based on a compensation scheme that varies based on the determined vibration state. The controller may include two or more actuator compensators, and may be configured to select among output of the two or more actuator compensators, based on the determined vibration state of the transducer, to control the positioning of the transducer. At least two of the actuator compensators have different disturbance transfer functions. One of the actuator compensators is configured to improve transducer track following while the transducer is subjected to vibration, such as by a vibration state actuator compensator, and another one of the actuator compensators is configured to improve throughput of data read from and/or written to the disk, such as by a non-vibration state actuator compensator. At least two of the actuator compensators each include an electronic device that is separately packed from other of the actuator compensators.

In some other embodiments of the present invention, a disk drive includes a rotatable disk, a transducer, an actuator, and a controller. The transducer is configured to read data from the disk. The actuator is configured to position the transducer relative to the disk. The controller is configured to control positioning of the transducer to maintain the transducer on a target one of the data tracks, and is configured to compensate for vibration effects on the transducer based on control parameters that vary based on a radial location of the target data track on the disk.

In some further embodiments of the present invention, the controller may be configured to have a better vibration response along an outermost radial portion of the disk than along an innermost radial portion of the disk. The controller may be configured to position the transducer with less offtrack error along an outermost radial portion of the disk than along an innermost radial portion of the disk. The controller may be configured to improve throughput of data read from and/or written to the disk along an outermost radial portion of the disk than along an innermost radial portion of the disk when the transducer is subject to vibration relative to the disk. The pitch between the data tracks may be larger along an outermost radial portion of the disk than along an innermost radial portion of the disk. The controller may be configured to control positioning of the transducer with respect to data tracks having a larger pitch along an outermost radial portion of the disk than along an innermost radial portion of the disk.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be through and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items.

The present invention may be embodied as servo controllers, disk drives, methods, and/or computer program products. Accordingly, the present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disk read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams, including operational flow charts, of servo controllers, disk drives, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 6:
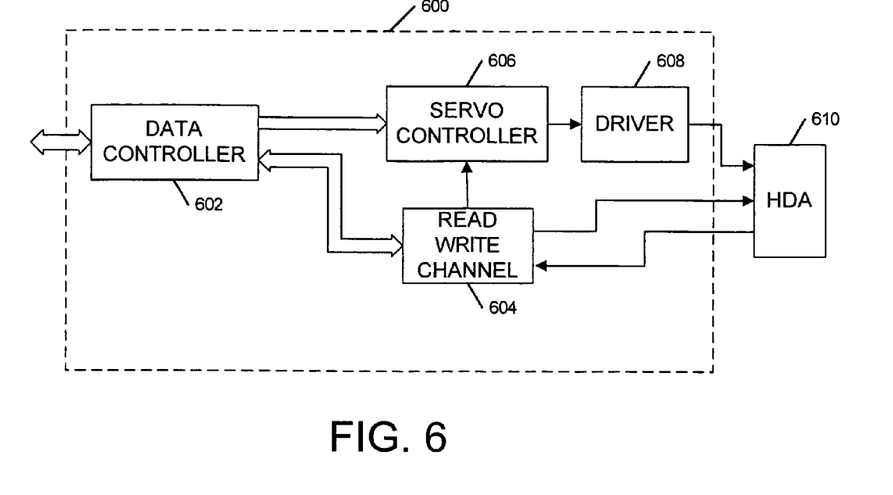
FIG. 6 is a block diagram of electronic circuits of a disk drive in accordance with some embodiments of the present invention.

Referring to FIG. 6, the electronic circuits 30 (FIG. 1) can include a data controller 602, a read/write channel 604, a servo controller 606, and a driver 612, which communicates with a head disk assembly 610 (i.e., actuator arm assembly 18 and disk stack 12 of FIG. 1) to seek to and follow tracks on the disks 34, and to read/write from tracks thereon. The servo controller 606 is configured to operate in accordance with at least one of the embodiments of the present invention. The data controller 602 can operate in a conventional manner to format data communicated between a host computer, or other external device, and the disks 34 through the read/write channel 54. The read/write channel 604 can operate in a conventional manner to convert data between the digital form used by the data controller 602 and the analog form used by the transducers 20. The read/write channel 604 also provides servo positional information read from the disks 34 to the servo controller 606. In particular, servo regions on the disks 34 can include transducer location information that indicates an address of each servo sector, and burst fields in the servo sectors to provide servo fine location information, and which can be used to detect the radial location of the transducer 20 relative to that track. The transducer location information is transferred to the servo controller 606, which uses it to perform seek and track following operations of the transducer 20 relative to data tracks on the disks 34.

Figure 7:
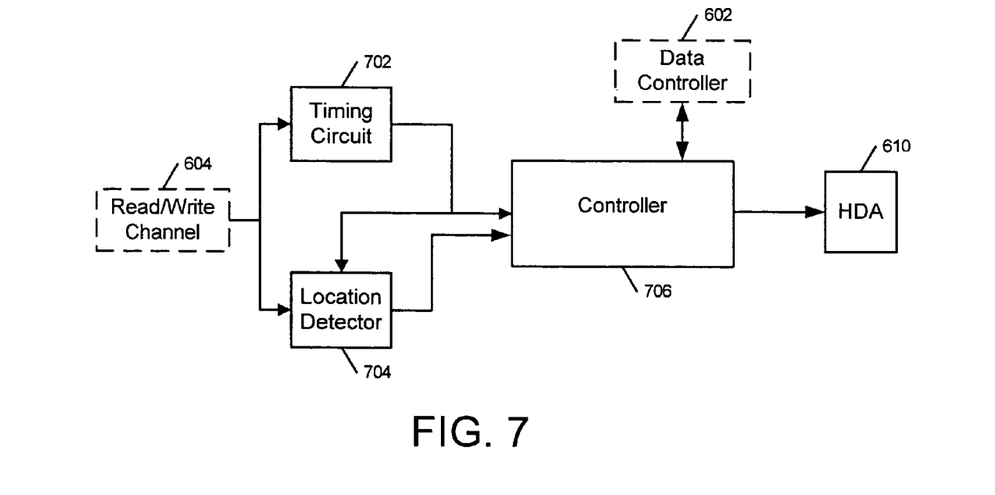
FIG. 7 is a block diagram of the servo controller of FIG. 6 in accordance with some embodiments of the present invention.

Referring to FIG. 7, the servo controller 606 can include a timing circuit 702, a location detector 704, and a controller 706. The controller 706 may be embodied in hardware and/or software, such as within one or more digital signal processors, general processor, and/or application specific integrated circuits. The timing circuit 702 can generate clock signals synchronized with the passage of servo sectors on tracks under the transducer 20. In response to the clock signals from the timing circuit 702, the location detector 704 detects transducer radial location from transducer location data provided by the read/write channel 604. The detected transducer location information in each servo sector provides the address of the track which contains the servo sector, and therefore, the location of the transducer 20 relative to that track. The controller 706 controls movement and positioning of the transducer 20 during seek operations and track following operations.

According to some embodiments of the present invention, the controller 706 is configured to determine a vibration state of the transducer 20 relative to the disk 34. The determined vibration state of the transducer 20 indicates whether the transducer 20 is subjected to vibration, and/or may indicate whether the transducer 20 is subjected to at least a threshold amount of vibration. The controller 706 is also configured to control positioning of the transducer 20 to maintain the transducer 20 on a track on the disk (i.e., during track following). The positioning is controlled based on a compensation scheme that varies based on the determined vibration state of the transducer 20. The controller 706 can include a plurality of actuator compensators.

Figure 8:
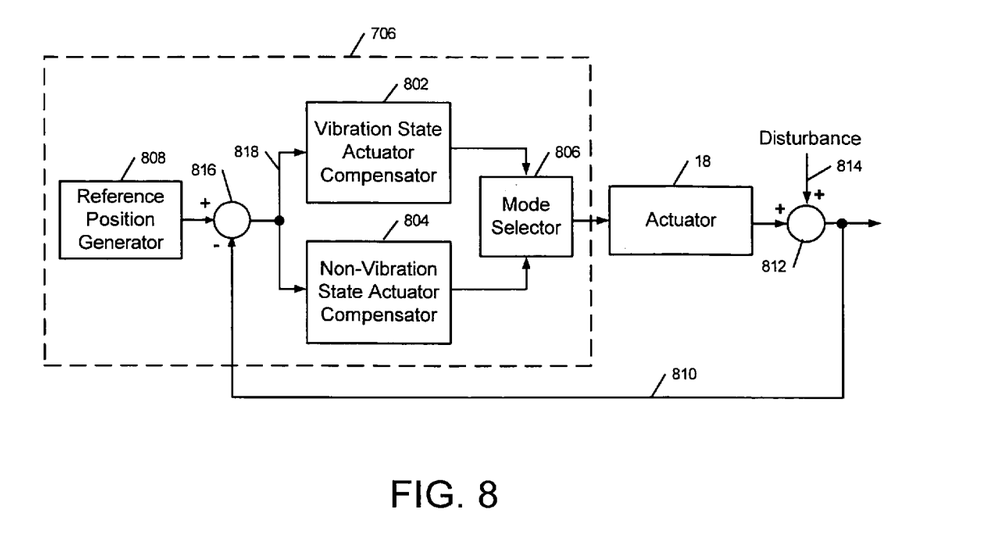
FIG. 8 is a block diagram of the controller of FIG. 7 in accordance with some embodiments of the present invention.

Referring to FIG. 8, an exemplary embodiment of the controller 706 is shown that includes two actuator compensators, a vibration state actuator compensator 802 and a non-vibration state actuator compensator 804, a mode selector 806, and a reference position generator 808. During a track following operation, the controller 706 senses, via the transducer 20, the servo patterns along the track to generate a sensed position signal 810, which indicates a position of the transducer 20 relative to the track. The position of the transducer 20 is affected by the combined effects, illustrated by summing node 812, of positioning of the actuator 18 and disturbances 814 on the transducer 20. The disturbances 814 can include a component due to vibration from external shock on the disk drive 10.

The sensed position signal 810 is fed-back to a summing node 816, where it is combined with a desired reference position signal from the reference position generator 808 to generate a position error signal 818. The desired reference position signal may be a DC value (e.g., static value), such as zero, for at least a portion of the revolution of the disks 30. The reference position generator 808 can be configured to drive the transducer 20 toward the centerline of a data track during track following.

The compensators 802, 804 are configured to control positioning of the transducer 20, based on the position error signal 818, to attempt to maintain the transducer 20 on a track during track following. However, the compensators 802, 804 have different disturbance transfer functions (i.e., ratio of their output response to their input) relative to each other when the transducer 20 is subjected to vibration. The vibration state actuator compensator 802 can be configured to provide better positioning of the transducer 20 during track following (i.e., less data track misregistration TMR and reduced likelihood of read/write data errors) while the transducer is subjected to vibration, relative to the non-vibration state actuator compensator 804. In contrast, the non-vibration state actuator compensator 804 can be configured to provide better positioning of the transducer 20 during track following while the transducer is not subjected to vibration (e.g., transducer 20 experiences less than a threshold amount of vibration), and, thereby, better throughput for data read from and/or written to the disk 34 through the transducer 20.

The compensators 802, 804 can be electronic devices that are separately packaged from each other. For example, the compensators 802, 804 can each include a separate digital signal processor, general purpose processor, and/or ASIC.

The mode selector 806 is configured to determine a vibration state of the transducer 20 relative to the disk 34, and to select between the output of the vibration state actuator compensator 802 or the output of the non-vibration state actuator compensator 804 based on that determination. The mode selector 806 passes the selected output of one of the compensators 802 and 804 as a control signal to the actuator 18, where it is used to position the transducer 20 relative to a track.

In an exemplary embodiment of the present invention, when the transducer 20 is subject to less than a threshold amount of vibration, the mode selector 806 selects the output of the non-vibration state actuator compensator 804 to pass through as the control signal to the actuator 18. In contrast, when the transducer 20 is subject to at least a threshold amount of vibration, the mode selector 806 selects the output of vibration state actuator compensator 802 to pass through as the control signal to the actuator 18. Accordingly, the controller 706 varies its compensation scheme between that provided by the two compensators 802, 804 based on a vibration state (e.g., an amount of vibration) of the transducer 20. The compensators 802, 804 can be configured to provide a response that is optimized to either vibration (i.e., by compensator 802) or non-vibration (i.e., by compensator 804). Thus, for example, positioning of the transducer 20 can be controlled to provide higher read/write data throughput in a non-vibration environment and higher read/write data reliability in a vibration environment.

The vibration state actuator compensator 802 and the non-vibration state actuator compensator 804 can operate in parallel responding to the position error signal 818, so that they each generate an output that is available to the mode selector 806 for use in controlling positioning of the transducer 20 by the actuator 18. To avoid a discontinuous change in the control signal provided to the actuator 18, the mode selector 806 may delay switching between the output of the compensators 802 and 804 until the transducer 20 is being moved between tracks in a seek operation. A discontinuous change in the control signal may be avoided by configuring the compensators 802, 804 to have the same number of control system response orders and similar delay (i.e., between input to output) responsive to the position error signal 818.

The mode selector 806 switches between the outputs of the compensators 802 and 804 based on the determined vibration state of the transducer 20, such as whether the transducer 20 is subjected to at least a threshold amount of vibration. The mode selector 806 may determine the vibration state of the transducer 20 by monitoring the position error signal 818, which may be provided to the mode selector 806 through the compensators 802, 804 or directly thereto. For example, the mode selector 806 may determine whether the position error signal 818 exceeds a threshold value a threshold number of times within a number of sectors and/or within an elapsed time (e.g. monitor bumps in the position error signal 818). The mode selector 806 may determine the vibration state of the transducer 20 by monitoring the power spectrum of the position error signal 818, which may indicate presence or absence of a threshold amount of vibration of the transducer 20. The mode selector 806 may determine the power spectrum of the position error signal 818 by, for example, performing a fast-Fourier transform thereon, such as via a floating point gate array (FPGA).

The vibration state of the transducer 20 may also be determined by monitoring throughput of data read from and/or written to the disk 34. While the non-vibration state actuator compensator 804 is controlling positioning of the transducer 20, a threshold amount of decrease in data throughput can indicate that the controller 804 is not able to sufficiently compensate for vibration of the transducer 20, and that a switch to the vibration state actuator compensator 802 is desired. In contrast, while the vibration state actuator compensator 802 is controlling positioning of the transducer 20, a threshold amount of rise in data throughput can indicate that the transducer 20 is subject to a sufficiently low vibration such that a switch to the non-vibration state actuator compensator 804 is desired.

For example, the mode selector 806 may switch from passing through the output from the non-vibration state actuator compensator 804 to passing through the output from the vibration state actuator compensator 802 if either the position error signal 818 exceeds a threshold value in at least 5% of the sectors 42 around the disk 34 (FIG. 4), or if the throughput of data read from and/or written to the disk 34 decreases by at least 5% from a threshold value. The mode selector 806 may then switch back to passing through the output of the non-vibration state actuator compensator 804 when both of these conditions are no longer satisfied.

The mode selector 806 may transition between the output of the compensators 802, 804 to provide a more continuous control signal to the actuator 18. For example, the mode selector 806 may increase a contribution of the output from one of the compensators 802, 804 while decreasing the contribution of the output from the other one of the compensators 802, 804 to the control signal provided to the actuator 18. An exemplary controller 706 that transitions between the output of the compensators 802, 804 is discussed with respect to FIG. 9.

Figure 9:
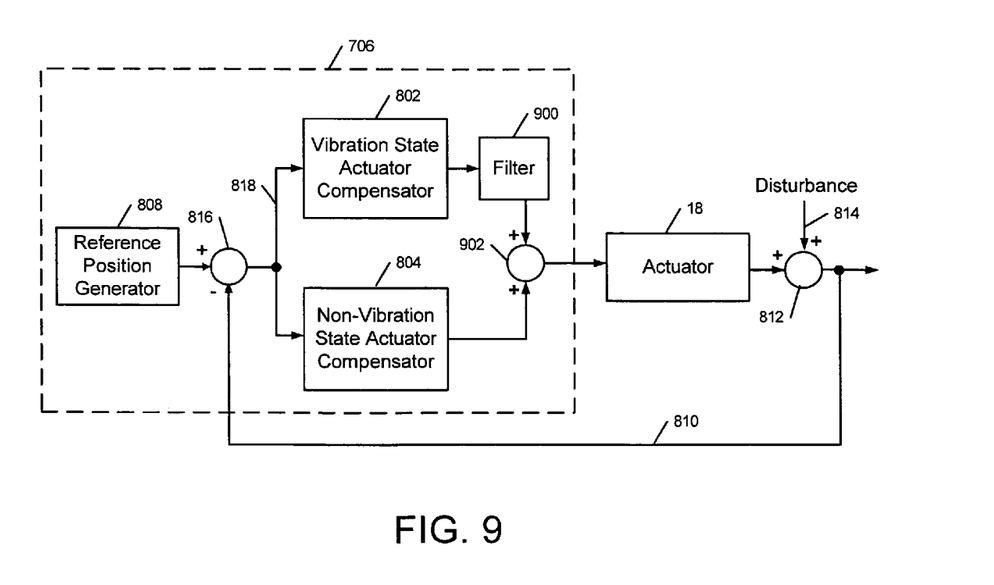
FIG. 9 is a block diagram of the controller of FIG. 7 in accordance with some other embodiments of the present invention.

Referring now to FIG. 9, another embodiment of the controller 706 is illustrated in accordance with some other embodiments of the present invention. The controller 706 shown in FIG. 9 differs from that shown in FIG. 8 by the replacement of the mode selector 806 (shown in FIG. 8) with a filter 900 and a summing node 902. The filter 900 filters the output of the vibration state actuator compensator 802 and provides the filtered output to the summing node 902.

The filter 900 filters the output of the compensator 802 by an amount that varies based on the determined vibration state of the transducer 20. For example, when the transducer 20 is subject to a low amount of vibration, the filter 902 may substantially attenuate the output of the compensator 802. In contrast, when the transducer 20 is subject to a high amount of vibration, the filter 902 may pass through substantially all of, and may amplify, the output of the compensator 802.

The summing node 902 combines the filtered output from the filter 900 with the output of the non-vibration state actuator compensator 804 to generate the control signal to the actuator 18 to control positioning of the transducer 20 on a track. Accordingly, the contribution of the output of the vibration state actuator compensator 802 to the positioning of the transducer 20 is varied based on the determined vibration state of the transducer 20.

As will be appreciated, the controller 706 shown in FIG. 9 may include another filter, or the filter 900 may be moved, to filter the output of the non-vibration state actuator compensator 804 before it is provided to the summing node 902. Accordingly, the contribution of the output of the non-vibration state actuator compensator 804 to the positioning of the transducer 20 can be varied based on the determined vibration state of the transducer 20.

Figure 10:
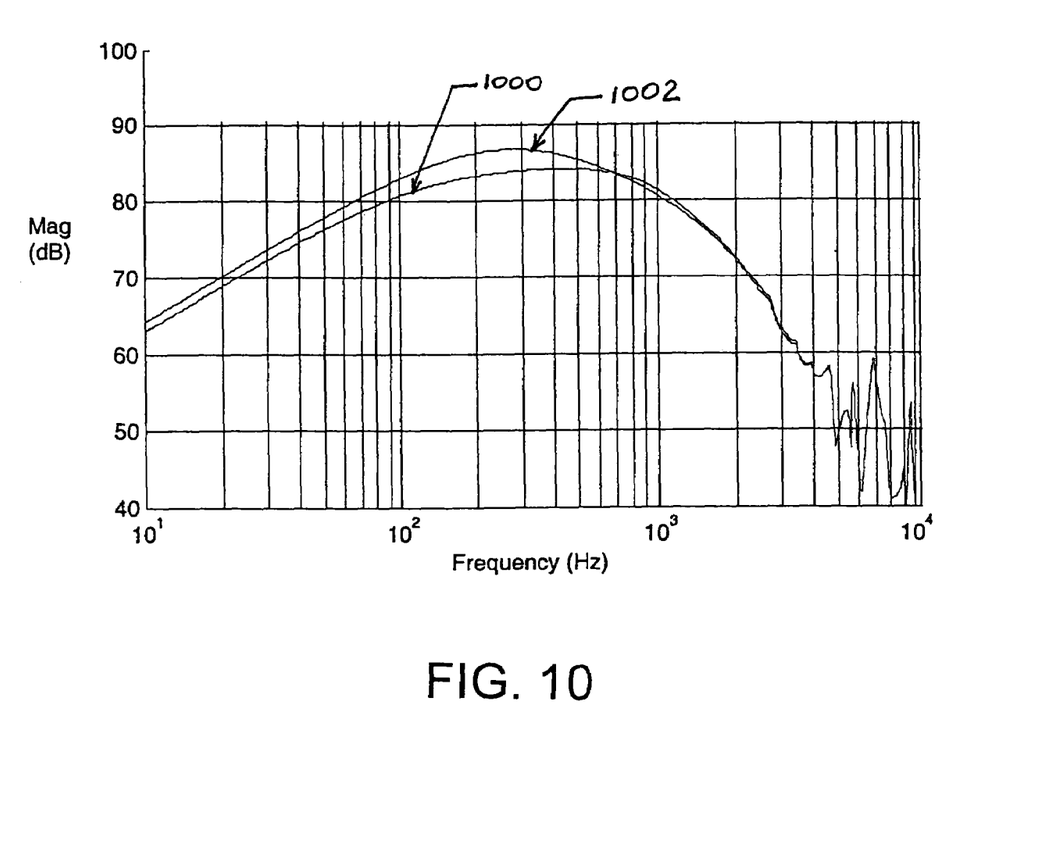
FIG. 10 is a graph from a simulation of the disturbance transfer functions of a vibration state actuator compensator and a non-vibration state actuator compensator responsive to external vibration in accordance with some other embodiments of the present invention.

Referring now to FIG. 10, a graph illustrates a simulation of the disturbance transfer functions of a vibration state actuator compensator and a non-vibration state actuator compensator responsive to external vibration, in accordance with some embodiments of the present invention. In the graph, frequency of the disturbance is shown along the x-axis, and the magnitude of the ratio of the output to the input of the respective compensators is shown along the y-axis. In the exemplary embodiment shown in FIG. 10, the vibration state actuator compensator is configured to provide a disturbance transfer function curve 1000 that has better response for controlling positioning of an actuator in vibration conditions compared to the disturbance transfer function curve 1002 of the non-vibration state actuator compensator.

When the disk drive 10 is subjected to vibration, the effect of the vibration on the transducer 20 and the associated response of the controller 706 can vary based on the radial position of the transducer 20 along the disk 34. The effect of the vibration and the response of the controller 706 and can also vary based on the location of the transducer 20 within the actuator assembly 18 (e.g., upper location versus lower location), when the assembly 18 includes a plurality of transducers 20. For example, when the transducer 20 is along an outermost radial portion of the disk 34, vibration of the transducer 20 can cause substantially more across track disturbance of the transducer 20 compared to when the transducer 20 is along an innermost radial portion of the disk 34.

In accordance with some embodiments of the present invention, data track pitch is varied based on a radial position of the track along the disk 34 to compensate for the effect of vibration on positioning of the transducer 20 by the controller 706. For example, data track pitch can be made larger along an outermost radial portion of the disk 34 than along an innermost radial portion of the disk 34. For example, data track pitch may increase from a low value along an innermost track location to a median value along a middle diameter track location, and further increase to a high value along outermost track location.

The data track pitch can be selected and varied across the disk 34 based on an analysis of the disturbance transfer function(s) of the controller 706. The analysis can be separately performed for each transducer 20 in the actuator arm assembly 18, so that the data track pitch on each of the disk surfaces 36 in the disk stack 12 can be adapted to compensate for the effects of vibration on the positioning of the corresponding one of the transducers 20. For example, the transducer 20 can have a different response to vibration when it is adjacent to an upper disk surface 36 compared to when it is adjacent to a lower disk surface 36, such as due the mechanical stricture of the actuator arm assembly 18. Accordingly, an upper disk surface 36 can have a different variation in data track pitch compared to a lower disk surface 36, and can further vary between disks within the disk stack 12.

The controller 706 can be configured to compensate for vibration effects on the transducer 20 during data track following using control parameters that vary based on a radial location of the data track on the disk 34. The controller 706 can thereby control positioning of the transducer 20 with a different response to vibration when the transducer 20 is along an innermost radial portion of the disk 34 versus when it is along an outermost radial portion of the disk 34. For example, the controller 706 can be configured to have a better vibration response along an outermost radial portion of the disk, to provide less off-track error (e.g., decreased TMR) and/or improved data throughput when the transducer 20 is subjected to vibration. The controller 706 can further be configured to position the transducer 20 with respect to data tracks having a larger pitch along an outermost radial portion of the disk 34 than along an innermost portion of the disk 34.

The controller 706 may control positioning of the transducer 20 during track following using a control algorithm that has gain values which vary based on a location of a selected track. The controller 706 may, for example, adjust the gain values based on a table of gain values and a corresponding location of the selected track, and/or it may adjust the gain values based on an known relationship between the gain values and location of the selected track (e.g., a polynomial approximation of the variation in gain values with location). The controller 706 may adjust the gain values during a seek operation while the transducer 20 is being moved to a target track.

Accordingly, as discussed above, the controller 706 may include one compensator that is configured to position the transducer 20 during track following with a vibration response that varies based on a radial location of the track, or it may include two or more compensators, each of which is configured to position the transducer 20 with a response that is optimized for the expected vibration effects and track pitch of different radial portions of the tracks (e.g., inner portion, middle portion, or outer portion).

By varying the data track pitch and associated positioning by the controller 706 based on radial location of a data track, the data track pitch may be decreased along radial portions of the disk 34 for which the compensator 706 can adequately compensate for the effects of vibration, which would thereby allow more tracks per inch and higher storage density along those portions of the disk 34. The data track pitch may be increased, with an associated decrease in data tracks per inch and storage density, for the particular portions of the disk 34 where the response of the controller 706 to vibration necessitates such change. Moreover, as discussed above, the data track pitch may be varied differently on different disk surfaces of the disk stack 12. Accordingly, the data track pitch can be varied based on radial track location for each disk surface to compensate for the corresponding response of the controller 706 at the radial track locations.

Figure 11:
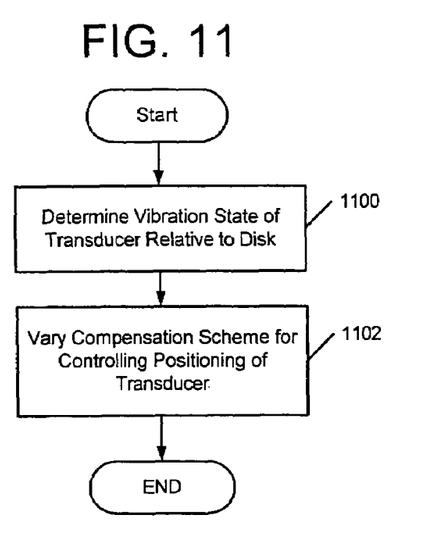
FIG. 11 illustrates a flowchart of operations for controlling positioning of a transducer, in accordance with some embodiments of the present invention.

FIG. 11 illustrates a flowchart of operations for controlling positioning of a transducer, in accordance with some embodiments of the present invention. These operations can be suitable for use by the controller 706 shown in FIG. 7. At Block 1100, the vibration state of the transducer 20 is determined. At Block 1102, the compensation scheme that is used to control positioning of the transducer 20 during track following is varied based on the determined vibration state of the transducer 20.

Figure 12:
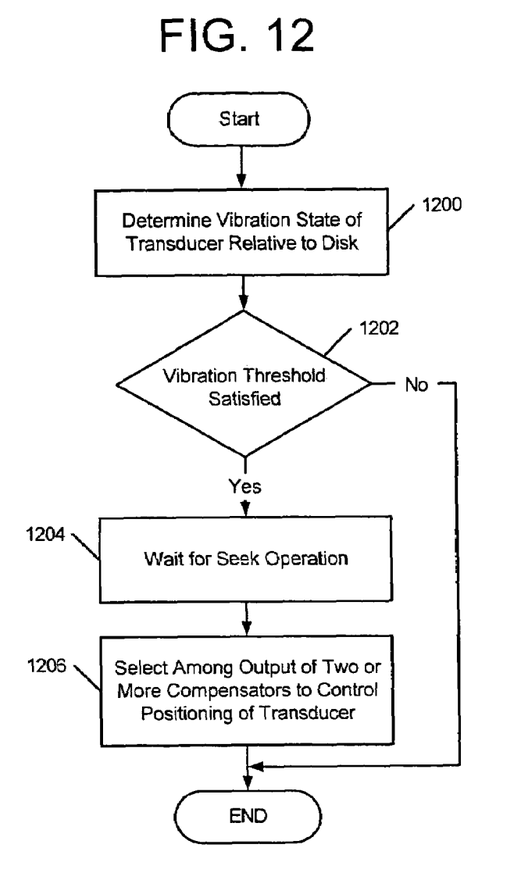
FIG. 12 illustrates a flowchart of operations for controlling positioning of a transducer, in accordance with some further embodiments of the present invention.

FIG. 12 illustrates a flowchart of operations for controlling positioning of a transducer, in accordance with some further embodiments of the present invention. These operations can be suitable for use by the controller 706 shown in FIG. 8. At Block 1200, the vibration state of the transducer 20 is determined. At Block 1202, a decision is made as to whether the transducer 20 is subjected to at least a threshold amount of vibration. When the transducer 20 is subjected to at least a threshold amount of vibration, then at Block 1204, variation of the compensation scheme is delayed until during a seek operation. At Block 1206, a selection is made between the output of two or more compensators to control positioning of the transducer 20 during a subsequent track following operation, based on the amount of vibration of the transducer 20.

Figure 13:
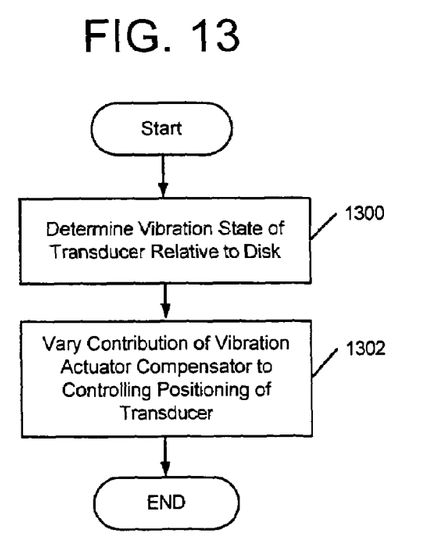
FIG. 13 illustrates a flowchart of operations for controlling positioning of a transducer, in accordance with some further embodiments of the present invention.

FIG. 13 illustrates a flowchart of operations for controlling positioning of a transducer, in accordance with some further embodiments of the present invention. These operations can be suitable for use by the controller 706 shown in FIG. 9. At Block 1300, the vibration state of the transducer 20 is determined. At Block 1302, the contribution of the output of a vibration state actuator compensator to the positioning of the transducer 20 during track following is varied based on the determined vibration state of the transducer 20.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of controlling positioning of a transducer that is adjacent to a rotatable disk in a disk drive, the method comprising:
   determining a vibration state of the transducer relative to the disk; and
   controlling positioning of the transducer to maintain the transducer on a track on the disk based on a compensation scheme that varies based on the determined vibration state of the transducer, wherein the controlling positioning of the transducer includes selecting among output of two or more compensators, based on the determined vibration state of the transducer, to control positioning of the transducer, and wherein one of the compensators is configured to improve transducer track following while the transducer is subjected to vibration, and another one of the compensators is configured to improve throughput of data read from and/or written to the disk.

2. A method of controlling positioning of a transducer that is adjacent to a rotatable disk in a disk drive, the method comprising:
   determining a vibration state of the transducer relative to the disk; and
   controlling positioning of the transducer to maintain the transducer on a track on the disk based on a compensation scheme that varies based on the determined vibration state of the transducer, wherein the controlling positioning of the transducer includes varying a contribution of an output of a vibration state actuator compensator to the control of positioning of the transducer, based on the determined vibration state of the transducer, wherein the vibration state actuator compensator is configured to improve transducer track following while the transducer is subjected to vibration, and wherein varying a contribution of an output of a vibration state actuator compensator to the control of positioning of the transducer comprises:
   filtering the output of the vibration state actuator compensator a variable amount based on the determined vibration state of the transducer; and
   combining the filtered output of the vibration state actuator compensator with an output of a non-vibration state actuator compensator to control the positioning of the transducer, wherein the non-vibration state actuator compensator is configured to improve throughput of data read from and/or written to the disk.

3. The method of claim 1, wherein determining a vibration state of the transducer relative to the disk comprises determining whether the transducer is subjected to at least a threshold amount of vibration.

4. A method of controlling positioning of a transducer that is adjacent to a rotatable disk in a disk drive, the method comprising:
   determining a vibration state of the transducer relative to the disk; and
   controlling positioning of the transducer to maintain the transducer on a track on the disk based on a compensation scheme that varies based on the determined vibration state of the transducer, wherein determining a vibration state of the transducer relative to the disk comprises monitoring a position error signal that is based on the transducer reading servo information on the disk, and wherein monitoring a position error signal comprises determining whether the position error signal repetitively exceeds a threshold value a threshold number of times within at least one of a number of sectors and an elapsed time.

5. A method of controlling positioning of a transducer that is adjacent to a rotatable disk in a disk drive, the method comprising:
   determining a vibration state of the transducer relative to the disk; and
   controlling positioning of the transducer to maintain the transducer on a track on the disk based on a compensation scheme that varies based on the determined vibration state of the transducer, wherein determining a vibration state of the transducer relative to the disk comprises monitoring a position error signal that is based on the transducer reading servo information on the disk, and wherein monitoring a position error signal comprises monitoring power spectrum of the position error signal.

6. A method of controlling positioning of a transducer that is adjacent to a rotatable disk in a disk drive, the method comprising:
   determining a vibration state of the transducer relative to the disk; and
   controlling positioning of the transducer to maintain the transducer on a track on the disk based on a compensation scheme that varies based on the determined vibration state of the transducer, wherein determining a vibration state of the transducer relative to the disk comprises monitoring throughput of data read from and/or written to the disk.

7. A disk drive comprising:
   a rotatable disk;
   a transducer configured to read data from the disk;
   an actuator that is configured to position the transducer relative to the disk; and
   a controller that is configured to determine a vibration state of the transducer relative to the disk, and to control positioning of the transducer to maintain the transducer on a track on the disk based on a compensation scheme that varies based on the determined vibration state of the transducer, wherein the controller comprises two or more actuator compensators, and is configured to select among output of the two or more actuator compensators based on the determined vibration state of the transducer to control the positioning of the transducer, wherein one of the actuator compensators is configured to improve transducer track following while the transducer is subjected to vibration, and another one of the actuator compensators is configured to improve throughput of data read from and/or written to the disk.

8. The disk drive of claim 7, wherein at least two of the actuator compensators each comprise an electronic device that is separately packaged from another one of the actuator compensators.

9. A disk drive comprising:
a rotatable disk;
a transducer configured to read data from the disk;
an actuator that is configured to position the transducer relative to the disk; and
a controller that is configured to determine a vibration state of the transducer relative to the disk, and to control positioning of the transducer to maintain the transducer on a track on the disk based on a compensation scheme that varies based on the determined vibration state of the transducer, wherein the controller comprises a vibration state actuator compensator and a non-vibration state actuator compensator, the vibration state actuator compensator has a different disturbance transfer function than the non-vibration state actuator compensator, and the controller is configured to combine an output of the non-vibration state actuator compensator with a variable amount of an output from the vibration state actuator compensator to control positioning of the transducer, wherein the variable amount of the output from the vibration state actuator compensator varies based on the determined vibration state of the transducer.

10. The disk drive of claim 9, wherein:
the vibration state actuator compensator is configured to improve transducer track following while the transducer is subjected to vibration; and
the non-vibration state actuator compensator is configured to improve throughput of data read from and/or written to the disk.

11. The disk drive of claim 9, wherein:
the controller comprises a filter that is configured to filter the output of the vibration state actuator compensator a variable amount based on the determined vibration state of the transducer, and to combine the filtered output of the vibration state actuator compensator with the output of the non-vibration state actuator compensator to control the positioning of the transducer.

12. A disk drive comprising:
a rotatable disk;
a transducer configured to read data from the disk;
an actuator that is configured to position the transducer relative to the disk; and
a controller that is configured to determine a vibration state of the transducer relative to the disk, and to control positioning of the transducer to maintain the transducer on a track on the disk based on a compensation scheme that varies based on the determined vibration state of the transducer, wherein the controller is configured to monitor a position error signal that is based on the transducer reading servo information on the disk to determine the vibration state of the transducer relative to the disk, and wherein the controller is configured to determine whether the position error signal exceeds a threshold value a threshold number of times within at least one of a number of sectors and an elapsed time to determine the vibration state of the transducer relative to the disk.

13. A disk drive comprising:
a rotatable disk;
a transducer configured to read data from the disk;
an actuator that is configured to position the transducer relative to the disk; and a controller that is configured to determine a vibration state of the transducer relative to the disk, and to control positioning of the transducer to maintain the transducer on a track on the disk based on a compensation scheme that varies based on the determined vibration state of the transducer, wherein the controller is configured to monitor a position error signal that is based on the transducer reading servo information on the disk to determine the vibration state of the transducer relative to the disk, and wherein the controller is configured to monitor power spectrum of the position error signal to determine the vibration state of the transducer relative to the disk.

14. A disk drive comprising:
a rotatable disk;
a transducer configured to read data from the disk;
an actuator that is configured to position the transducer relative to the disk; and
a controller that is configured to determine a vibration state of the transducer relative to the disk, and to control positioning of the transducer to maintain the transducer on a track on the disk based on a compensation scheme that varies based on the determined vibration state of the transducer, wherein the controller is configured to determine the vibration state of the transducer relative to the disk based on throughput of data read from and/or written to the disk.

15. A disk drive comprising:
a rotatable disk;
a transducer configured to read data from the disk;
an actuator that is configured to position the transducer relative to the disk; and
a controller that is configured to determine a vibration state of the transducer relative to the disk, and to control positioning of the transducer to maintain the transducer on a track on the disk based on a compensation scheme that varies based on the determined vibration state of the transducer, wherein the controller comprises an actuator compensator that is configured to compensate for vibration affects on the transducer using control parameters that vary based on a radial location of the target data track on the disk.

16. A disk drive comprising:
a rotatable disk;
a transducer configured to read and write data from the disk;
an actuator that is configured to position the transducer relative to a plurality of data tracks on the disk; and
a controller that is configured to control positioning of the transducer to maintain the transducer on a target one of the data tracks, and is configured to compensate for vibration affects on the transducer based on control parameters that vary based on a radial location of the target data track on the disk.

17. The disk drive of claim 16, wherein the controller is configured to have a better vibration response along an outermost radial portion of the disk than along an innermost radial portion of the disk.

18. The disk drive of claim 17, wherein the controller is configured to position the transducer with less offtrack error along an outermost radial portion of the disk than along an innermost radial portion of the disk.

19. The disk drive of claim 17, wherein pitch between the data tracks is larger along an outermost radial portion of the disk than along an innermost radial portion of the disk.

20. The disk drive of claim 16, wherein the controller is configured to improve throughput of data read from and/or written to the disk along an outermost radial portion of the disk than along an innermost radial portion of the disk when the transducer is subject to vibration relative to the disk.

21. The disk drive of claim 16, wherein pitch between the data tracks varies with radial location on the disk.

22. The disk drive of claim 16, wherein the controller is configured to control positioning of the transducer with respect to data tracks having a larger pitch along an outermost radial portion of the disk than along an innermost radial portion of the disk.

* * * * *